V. G. SMITH.
CAMERA ATTACHMENT.
APPLICATION FILED APR. 2, 1917. RENEWED MAY 24, 1918.
1,289,943.
Patented Dec. 31, 1918.
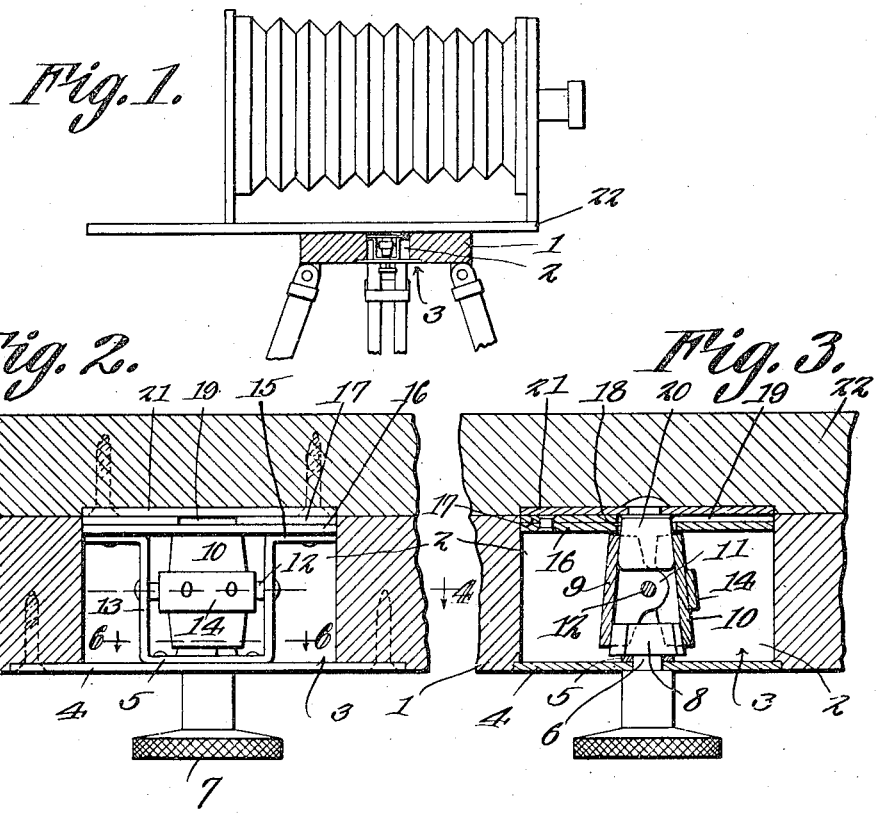
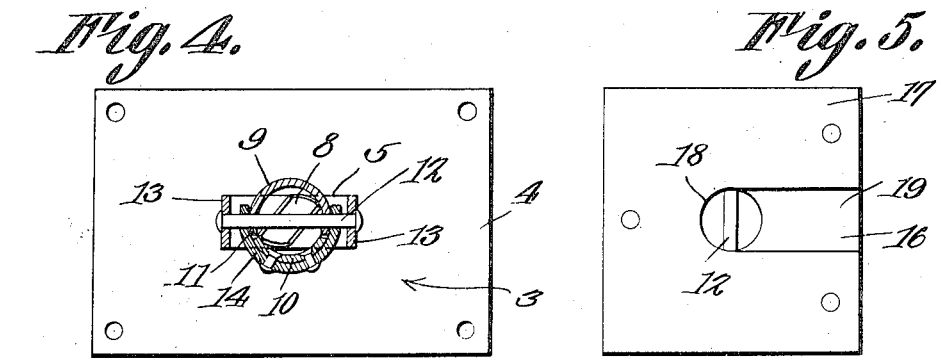
Inventor
V. G. Smith
By C. A. Snow & Co.
Attorneys
Witness

UNITED STATES PATENT OFFICE.

VOORHEES GILBERT SMITH, OF IOLA, KANSAS, ASSIGNOR TO ARTHUR E. GIBSON AND LEIGH V. BOWLUS, BOTH OF IOLA, KANSAS.

CAMERA ATTACHMENT.

1,289,943.

Specification of Letters Patent.

Patented Dec. 31, 1918.

Application filed April 2, 1917, Serial No. 159,296. Renewed May 24, 1918. Serial No. 236,409.

*To all whom it may concern:*

Be it known that I, VOORHEES G. SMITH, a citizen of the United States, residing at Iola, in the couny of Allen and State of Kansas, have invented a new and useful Camera Attachment, of which the following is a specification.

This invention aims to provide a simple and efficient means for detachably connecting a camera, transit or other object upon a tripod.

Another object of the invention is to provide means for guiding a camera or other object into position for locking upon a tripod.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side view of a camera upon a tripod, showing the top of the tripod in section to illustrate the application of the invention.

Fig. 2 is a detail side view of the invention *per se* with the adjacent portions of the camera and tripod in section.

Fig. 3 is a side view of the invention partly in section.

Fig. 4 is a view on the line 4—4 of Fig. 2.

Fig. 5 is a plan view of the guiding means.

Fig. 6 is a view on the line 6—6 of Fig. 2.

In the drawings, the tripod top 1 is cut away as at 2 to receive the gripping portion of the camera attachment, generally designated by 3.

The gripping portion 3 consists of a bottom plate 4 to which is secured the bracket 5. Registering openings are provided in the bottom plate 4 and bracket 5 to receive the shank 6 of the operating knob 7. A cam 8 mounted on the shank 6 engages arcuate locking or gripping jaws 9 and 10. The gripping jaw 9 has opposed ears 11 engaging the pivot pin 12 supported within openings in the upstanding arms 13 of the bracket 5. The gripping jaw 10 has cut away portions to receive the ears 11 of the gripping jaw 9 and is provided with an arcuate collar 14 for engagement with the pin 12. The bracket arms 13 are bent to form feet 15 to which are secured the superposed connected plates 16 and 17. An opening 18 in the plate 16 directly above the gripping jaws 9 and 10 registers with the inner termination of the cut away portion 19 in the top plate 17 to permit insertion of the depending upwardly tapered locking lug 20 on the plate 21 carried by the bottom 22 of the camera.

The cut away portion 19 forms a guide to facilitate insertion of the locking lug 20 within the opening 18 to a position between the gripping jaws 9 and 10. The operating knob 7 is then turned until the cam 8 forces the jaws 9 and 10 into binding engagement with the lug 20 to hold the camera or transit in position upon the tripod.

What is claimed is:

1. The combination with a lug for attachment to a camera or the like, said lug being circular in cross section and of varying diameter, of opposed arcuate jaws pivotally mounted, said lug being insertible between the jaws, and means below the lug and revoluble about the axis thereof for spreading apart the lower ends of the jaws to bind the upper ends thereof upon the inserted lugs.

2. The combination with a lug for attachment to the bottom of a camera or the like, said lug gradually increasing in diameter toward its free end, of a supporting structure, opposed jaws pivotally connected between their ends and within said structure, said jaws being arcuate in cross section, the lug being insertible between the jaws at one end, a cam mounted for rotation between the jaws at the other end, and means for actuating the cam to bind the jaws upon the inserted lug.

3. The combination with a supporting structure having a recess, a plate extending over the recess and having an aperture, there being a guide groove leading to the aperture, of a tapered lug for attachment to the bottom of a camera or the like, said lug being shiftable along the groove and into the aperture, the diameter of the lug increasing toward the free end thereof, opposed jaws pivotally mounted within the recess, said jaws being arcuate in cross section and adapted to receive the lug between them at one end, and spreading means movably mounted between the other ends of the jaws to bind the jaws upon the inserted lug.

4. The combination with a supporting structure having a recess, a plate extending over the recess and having an aperture, there being a guide groove leading to the aperture, of a tapered lug for attachment to the bottom of a camera or the like, said lug being shiftable along the groove and into the aperture, the diameter of the lug increasing toward the free end thereof, opposed jaws pivotally mounted within the recess, said jaws being adapted to receive the lug between them at one end, and spreading means movably mounted between the other ends of the jaws to bind the jaws upon the inserted lug.

In testimony that I claim the foregoing as my own, I have hereto affixed my signature in the presence of two witnesses.

VOORHEES GILBERT SMITH.

Witnesses:
A. L. PARKS,
G. S. STONER.

Copies of this patent may be obtained for five cents each, by addressing the "Commissioner of Patents, Washington, D. C."